United States Patent
Nanaumi et al.

(10) Patent No.: US 11,853,736 B2
(45) Date of Patent: Dec. 26, 2023

(54) MODULE, INFORMATION PROCESSING DEVICE EQUIPPED WITH SAME, AND METHOD FOR UPDATING PROGRAM DATA TO UPDATE PROGRAM DATA IN MODULE

(71) Applicant: NTT ELECTRONICS CORPORATION, Yokohama (JP)

(72) Inventors: Yasuyuki Nanaumi, Yokohama (JP); Atsushi Kusayama, Yokohama (JP); Kiyoshi Kido, Yokohama (JP); Yuji Akahori, Yokohama (JP)

(73) Assignee: NTT ELECTRONICS CORPORATION, Kanagawa (JP)

( * ) Notice: Subject to any disclaimer, the term of this patent is extended or adjusted under 35 U.S.C. 154(b) by 262 days.

(21) Appl. No.: 17/299,166

(22) PCT Filed: Sep. 2, 2019

(86) PCT No.: PCT/JP2019/034383
§ 371 (c)(1),
(2) Date: Jun. 2, 2021

(87) PCT Pub. No.: WO2020/129324
PCT Pub. Date: Jun. 5, 2020

(65) Prior Publication Data
US 2022/0035619 A1    Feb. 3, 2022

(30) Foreign Application Priority Data

Dec. 20, 2018   (JP) ................. 2018-238133

(51) Int. Cl.
*G06F 8/65* (2018.01)
*G06F 9/4401* (2018.01)

(52) U.S. Cl.
CPC .............. *G06F 8/65* (2013.01); *G06F 9/4406* (2013.01)

(58) Field of Classification Search
CPC ........................................................ G06F 8/65
See application file for complete search history.

(56) References Cited

U.S. PATENT DOCUMENTS

| 5,168,442 A | * | 12/1992 | Ikeda | ................... | G05B 19/056 |
| | | | | | 700/18 |
| 5,206,572 A | * | 4/1993 | Farag | ................... | H02H 7/0822 |
| | | | | | 318/778 |

(Continued)

FOREIGN PATENT DOCUMENTS

| EP | 3901765 A1 | 10/2021 |
| JP | 2005-032014 | 2/2005 |

(Continued)

OTHER PUBLICATIONS

Japanese Office Action (with English translation) dated Nov. 15, 2022 for Japanese Appl. No. 2018-238133.

(Continued)

*Primary Examiner* — Jae U Jeon
(74) *Attorney, Agent, or Firm* — Ohlandt, Greeley and Perle, LLP

(57) ABSTRACT

Ensuring that a control program of a programmable electronic component included in an optical module updatable as well while a control program of a microprocessor included in the optical module is in operation.

A module that functions by causing an electronic component to operate, a microprocessor located in the module and coupled to a host device via communicating device uses data in the S-record format downloaded from the host device using the communicating device to update a control program of the electronic component.

10 Claims, 15 Drawing Sheets

(56) References Cited

U.S. PATENT DOCUMENTS

| | | | |
|---|---|---|---|
| 8,429,643 B2* | 4/2013 | Venkatachalam | G06F 21/72 717/173 |
| 2003/0083929 A1* | 5/2003 | Springer | G06Q 30/0241 705/14.36 |
| 2006/0164257 A1* | 7/2006 | Giubbini | H04B 3/546 340/870.02 |
| 2006/0200812 A1* | 9/2006 | Mizutani | G06F 8/658 717/168 |
| 2012/0297211 A1* | 11/2012 | Lee | G06F 8/65 713/310 |
| 2013/0132935 A1* | 5/2013 | Kuroki | G06F 8/654 717/168 |
| 2016/0356643 A1* | 12/2016 | Foucal | G02B 6/43 |
| 2022/0035619 A1 | 2/2022 | Nanaumi et al. | |

FOREIGN PATENT DOCUMENTS

| | | |
|---|---|---|
| JP | 2006-201878 | 8/2006 |
| JP | 2008-257564 | 10/2008 |
| JP | 2009-014858 | 1/2009 |
| JP | 2010-195111 | 9/2010 |
| JP | 2012-093961 | 5/2012 |
| WO | 20200129234 A1 | 6/2020 |

OTHER PUBLICATIONS

Extended European Search Report dated Aug. 2, 2022 for European Appl. No. 19900098.5.

Canadian Office Action dated Aug. 18, 2022 for Canadian Appl. No. 3,123,795.

"Renesas SynergyTM Cases of updating applications in built-in flash memory," Renesas Electronics Corporation, Rev. 1.01, 2017 with computer generated English abstract thereof.

"S-Record Output Format," "Motorola M68000 Family Programmer's Reference Manual" Appendix C, Motorola, 1992.

International Search Report dated Nov. 19, 2019 in corresponding PCT International Patent Application No. PCT/JP2019/034383, 2 pgs.

* cited by examiner

D#12: Common Program Data for Programmable Electronic Components 22#1, 22#2

MODULE, INFORMATION PROCESSING DEVICE EQUIPPED WITH SAME, AND METHOD FOR UPDATING PROGRAM DATA TO UPDATE PROGRAM DATA IN MODULE

CROSS-REFERENCED APPLICATIONS

This applicant claims priority from International Patent Application Serial No. PCT/JP2019/034383, filed on Sep. 2, 2019 which claims priority to Japanese Patent Application No. 2018-238133, filed on Dec. 20, 2018, both of which are included herein in their entireties by reference thereto.

BACKGROUND

1. Field of the Disclosure

This disclosure relates to a method for updating program data for an electronic component of a module included in an information processing device.

2. Discussion of the Background Art

As described in a chapter of "overview" on page 6 of Non-Patent Literature 1, data in Motorola (registered trademark) S-record format (hereinafter referred to as the S-record format) is used for writing program data from an external host computer into a non-volatile memory inside a microprocessor. Specifications of the S-record format is described in APPENDIX C of Non-Patent Literature 2 by Motorola (registered trademark). The microprocessor refers to record types from S0 to S9 included in the S-record format data to recover program data on the memory based on information on an address included in the S1, S2 or S3 record.

An optical module installed in an optical transmission device has a function to download program data using data in the S-record format from a host device coupled via communicating means and update it, as means to update a control program of a microprocessor included in the module during an operation.

However, the updating means of this program data aims for updating the program data of the control program of the microprocessor coupled to the host device via the communicating means, and an update of program data of a control program of another programmable electronic component included in the optical module has not been considered. Accordingly, in order to update the program data of the control program of the programmable electronic component not coupled to the host device, it is necessary to perform it from other communicating means individually prepared for these electronic components, thereby causing a problem that the update is difficult during the operation of the optical transmission device.

CITATION LIST

Non-Patent Literature

Non-Patent Literature 1: "Renesas Synergy™ Cases of updating applications in built-in flash memory," Renesas Electronics Corporation, Rev. 1.01, 2017
Non-Patent Literature 2: "S-RECORD OUTPUT FORMAT," "MOTOROLA M68000 FAMILY Programmer's Reference Manual" Appendix C, MOTOROLA, 1992

Technical Problem

An objective of this disclosure is to ensure making program data of a control program of a programmable electronic component included in an optical module updatable as well while a control program of a microprocessor included in the optical module is in operation.

SUMMARY

A module of this disclosure is a module that functions by causing an electronic component to operate, the module including
    a microprocessor coupled to the electronic component via communicating means, wherein
    the electronic component incorporates a control program, the microprocessor:
        causes the electronic component to operate by transmitting control data to the electronic component via the communicating means; and
        when the microprocessor receives update information, the microprocessor selects program data corresponding to the electronic component from the update information, and downloads the program data to the electronic component via the communicating means.
Specifically, a method for updating program data according to this disclosure is a method for updating program data to update control programs of a microprocessor that controls an operation of an electronic component and the electronic component in a module that functions by causing the electronic component to operate, the method for updating program data including
    executing by the microprocessor:
        obtaining update information including blocks in each of which a header record that indicates a start of a record and includes identification information that identifies an update target, program data for updating the control program of the update target corresponding to the identification information written in the header record, and an end record that indicates a terminating end of the record are written in a sequence, and recovering the program data included in the update information by each block on a memory;
        determining whether the update target is the microprocessor or the electronic component using the identification information written in the header record; and
        updating the control program of the update target using the program data recovered on the memory corresponding to the update target.
Specifically, a module according to this disclosure is a module that functions by causing an electronic component to operate, the module including
    a memory that stores program data; and a microprocessor that controls an operation of the electronic component, wherein
    the microprocessor:
        obtains update information including blocks in each of which a header record that indicates a start of a record and includes identification information on an update target, the program data for updating a control program of the update target corresponding to the identification information written in the header record, and an end record that indicates a terminating end of the record are written in a sequence, and recovers the program data included in the update information by each block on the memory;
        determines whether the update target is the microprocessor or the electronic component using the identification information written in the header record; and updates also the program data of the electronic component using communicating means that couples between the microprocessor and the electronic component.

Specifically, an information processing device according to this disclosure includes:
- at least one module according to this disclosure;
- a communication unit that receives the update information from an outside; and
- a host device that transfers the update information that has been received by the communication unit to each microprocessor included in the module.

Advantageous Effects of Invention

This disclosure ensures making the program data of the control program of the programmable electronic component included in the optical module updatable as well while the control program of the microprocessor included in the optical module is in operation.

BRIEF DESCRIPTION OF DRAWINGS

FIG. 6 is an exemplary description of an S0 record according to this disclosure.

DETAILED DESCRIPTION OF THE PREFERRED EMBODIMENT

Figure 1:
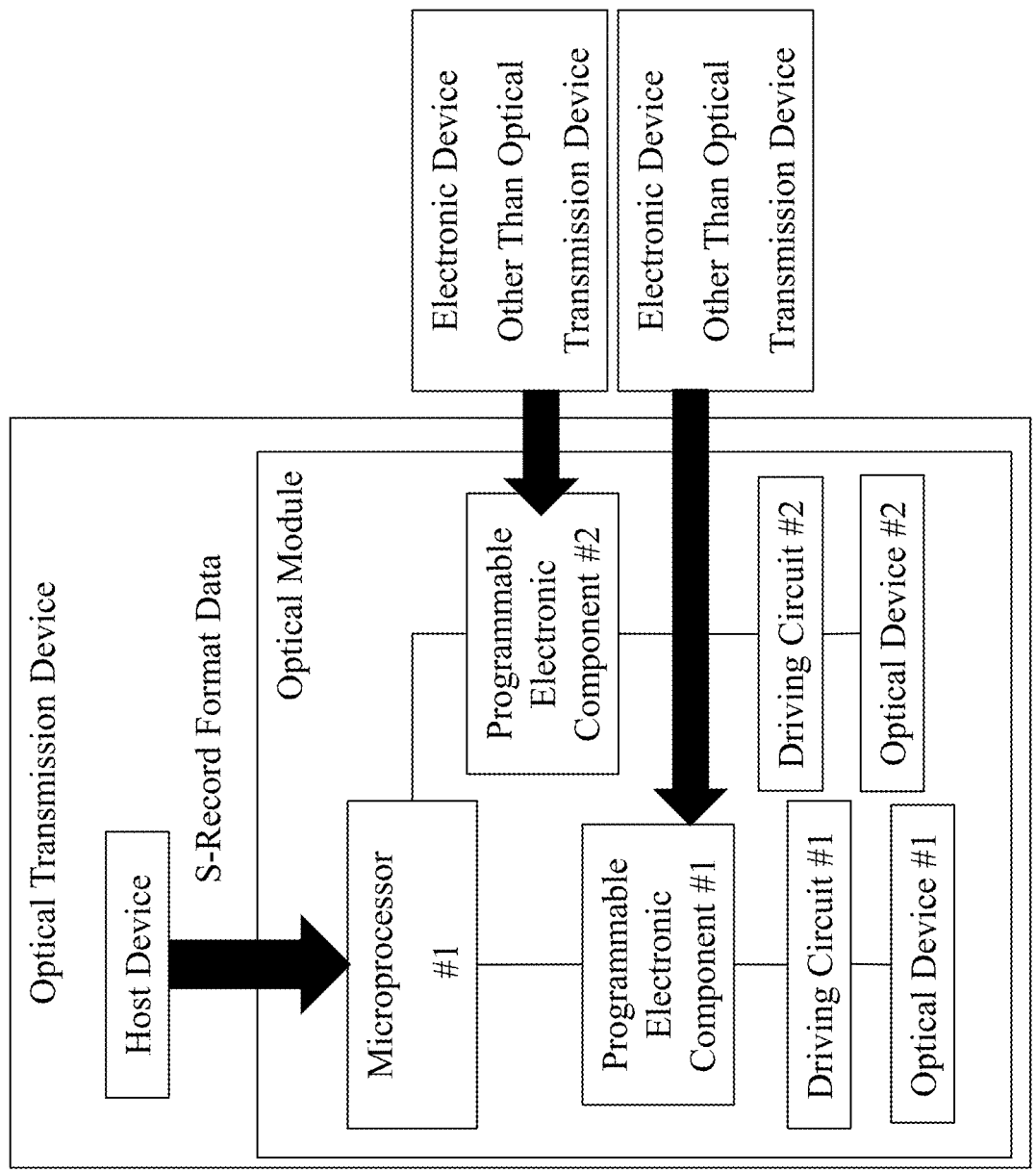
FIG. 1 is an example of a method for downloading program data to an optical module according to related art.

The following describes embodiments of this disclosure in detail with reference to the drawings. Note that this disclosure is not limited to the embodiments described below. These working examples are merely examples, and this disclosure can be executed in configurations in which various changes and improvements are performed based on knowledge of those skilled in the art. Note that components with the same reference numeral in the specification and the drawings should mutually indicate the same component.

Related Art

FIG. 1 illustrates a method for updating program data according to related art using data in the S-record format. In this drawing, thick arrows indicate paths on which program data for update are downloaded via communicating means.

A host device and an optical module are disposed in an optical transmission device, and the host device and a microprocessor #1 mounted in the optical module are coupled via the communicating means. Besides the microprocessor #1, a plurality of optical devices #1 and #2, driving circuits #1 and #2 that drive them, and programmable electronic components #1 and #2 that control the driving circuits #1 and #2, respectively, are mounted in the optical module.

The programmable electronic components #1 and #2 and the microprocessor #1 are coupled via the communicating means. When program data of the optical module is updated, new program data is transmitted in the S-record format from the host device to the microprocessor #1 in the optical module. Only the program data of the above-described microprocessor #1 is included in the data in the S-record format, and by recovering and executing the program data on a memory, the microprocessor #1 ensures switching it to the program data of the new control program.

Figure 2:
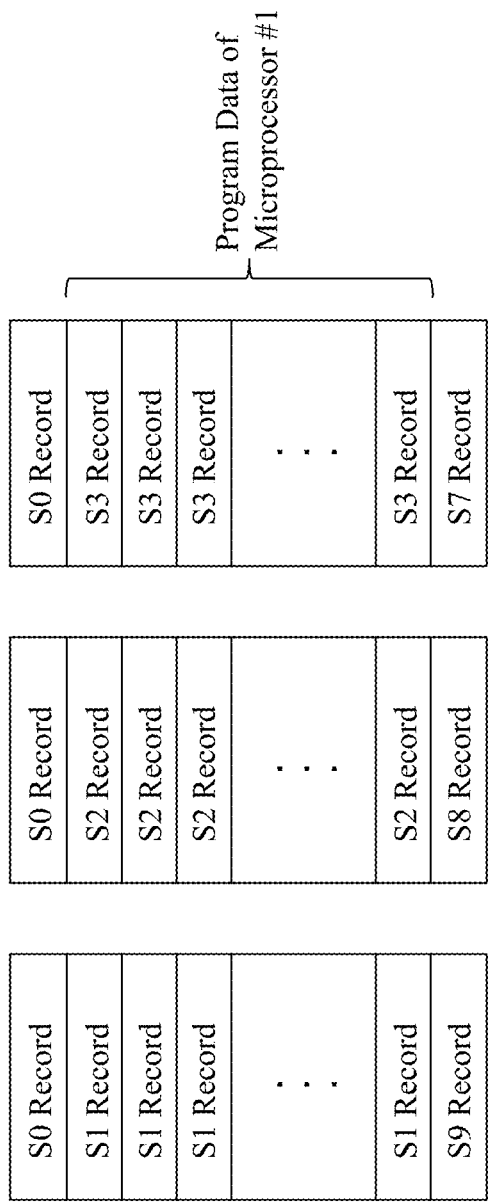
FIG. 2 is an example of S-record format data downloaded from a host device according to related art.

FIG. 2 illustrates a configuration of S-records transmitted to the optical module at this time. The respective records indicated by squares are constituted of character strings starting from ASCII codes of S0, S1 to S9. Specifications of these records are described in Non-Patent Literature 2.

Record types referred in S-record format data are as follows.

S0 record: a header record indicative of a start of an S-record.

S1 to S3 records: data records specifying respective write positions of data, S1 specifies it with a 2-byte address, S2 specifies it with a 3-byte address, and S3 specifies it with a 4-byte address.

S7 to S9 records: end records indicative of respective terminating ends of the S-records, S7 indicates the end of the 4-byte addressing, S8 indicates the end of the 3-byte addressing, and S9 indicates the end of the 2-byte addressing.

A combination of S0, S1, and S9, a combination of S0, S2, and S8, or a combination of S0, S3, and S7 is used. In this embodiment, a description is made by using the combination of S0, S1, and S9, which specifies it with the 2-byte address, as one example.

However, in this method for updating program data, program data necessary for the programmable electronic components other than the microprocessor #1 are downloaded from electronic devices other than the optical transmission device via other communication paths disposed for the respective programmable electronic components #1 and #2 at a phase before the optical module is installed in the optical transmission device. Accordingly, this method for updating program data has had a problem that the program data of control programs of the programmable electronic components #1 and #2 that do not have communicating means with the host device cannot be updated during the operation of the optical transmission device.

(Exemplary Configuration according to this Disclosure)

Figure 3:
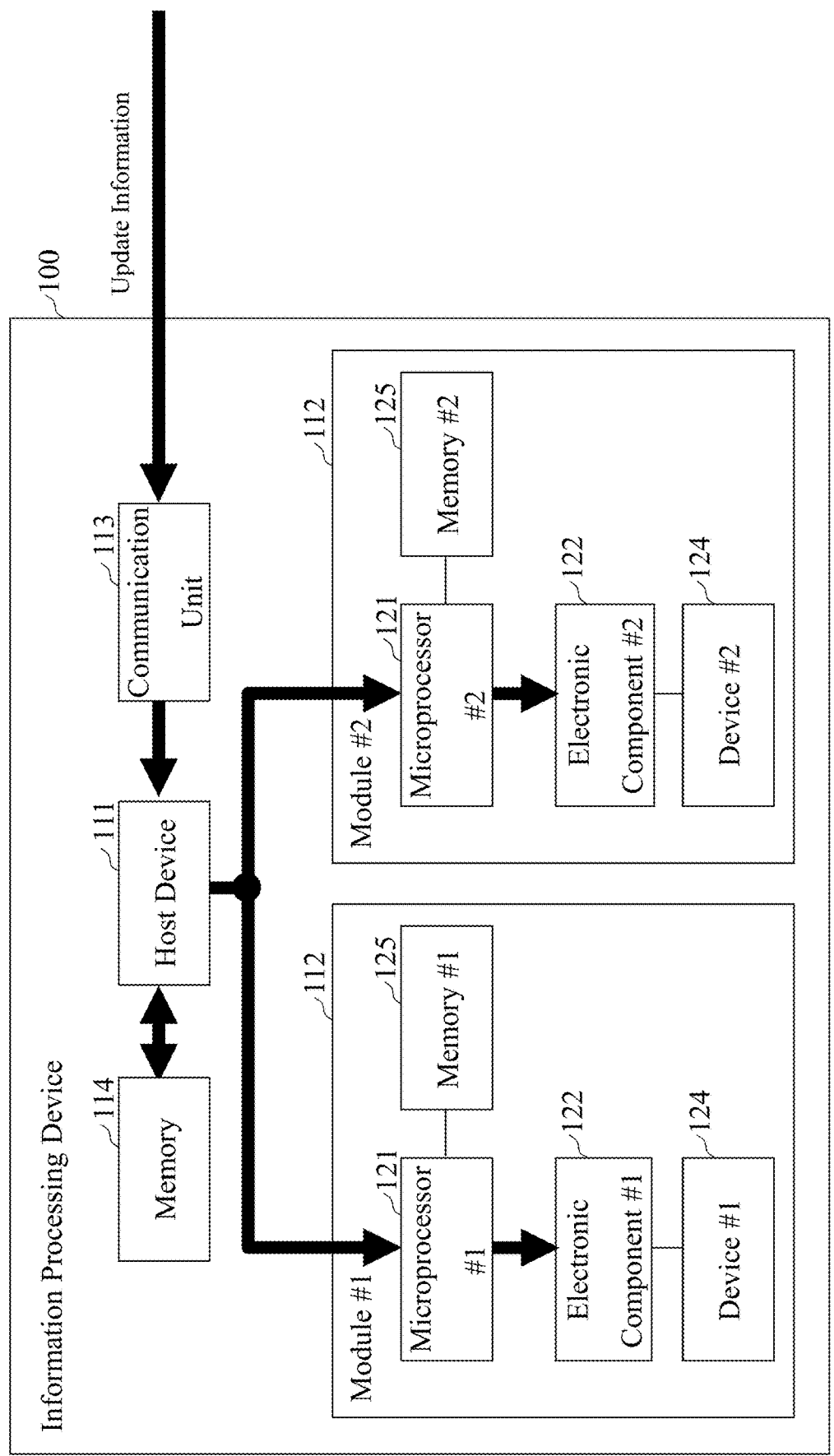
FIG. 3 is an example of an information processing device according to this disclosure.

FIG. 3 illustrates an example of an information processing device according to this disclosure. An information processing device 100 according to this disclosure includes a host device 111, a module 112, and a communication unit 113. The host device may include a memory 114. The module 112 includes a microprocessor 121 and an electronic component 122. The module 112 may include a device 124 and a memory 125. The module 112 according to this disclosure may be achieved by causing the microprocessor 121 to execute a program stored in the memory 125.

The module 112 is a module that achieves any function by causing the device 124 to operate in the following sequence of operations, and corresponds to an optical module 12 illustrated in and after FIG. 4. First, the microprocessor 121 transmits control data to the electronic component 122 by a built-in control program. Next, the electronic component 122 causes the device 124 to operate according to the above-described control data by a built-in control program.

The communication unit 113 obtains update information and any other information from an outside of the information processing device 100. The host device 111 has a function to control the module 112, such as execution and stop of the module 112, and corresponds to a host device 11 illustrated in and after FIG. 4. The host device 111 transfers the update information and any other information obtained by the communication unit 113 to the microprocessor 121. The host device 111 may record the above-described information in the memory 114. Components such as the electronic component 122 and the device 124 that constitute the module 112 may be each plural. The host device 111 may include a plurality of the modules 112.

Figure 4:
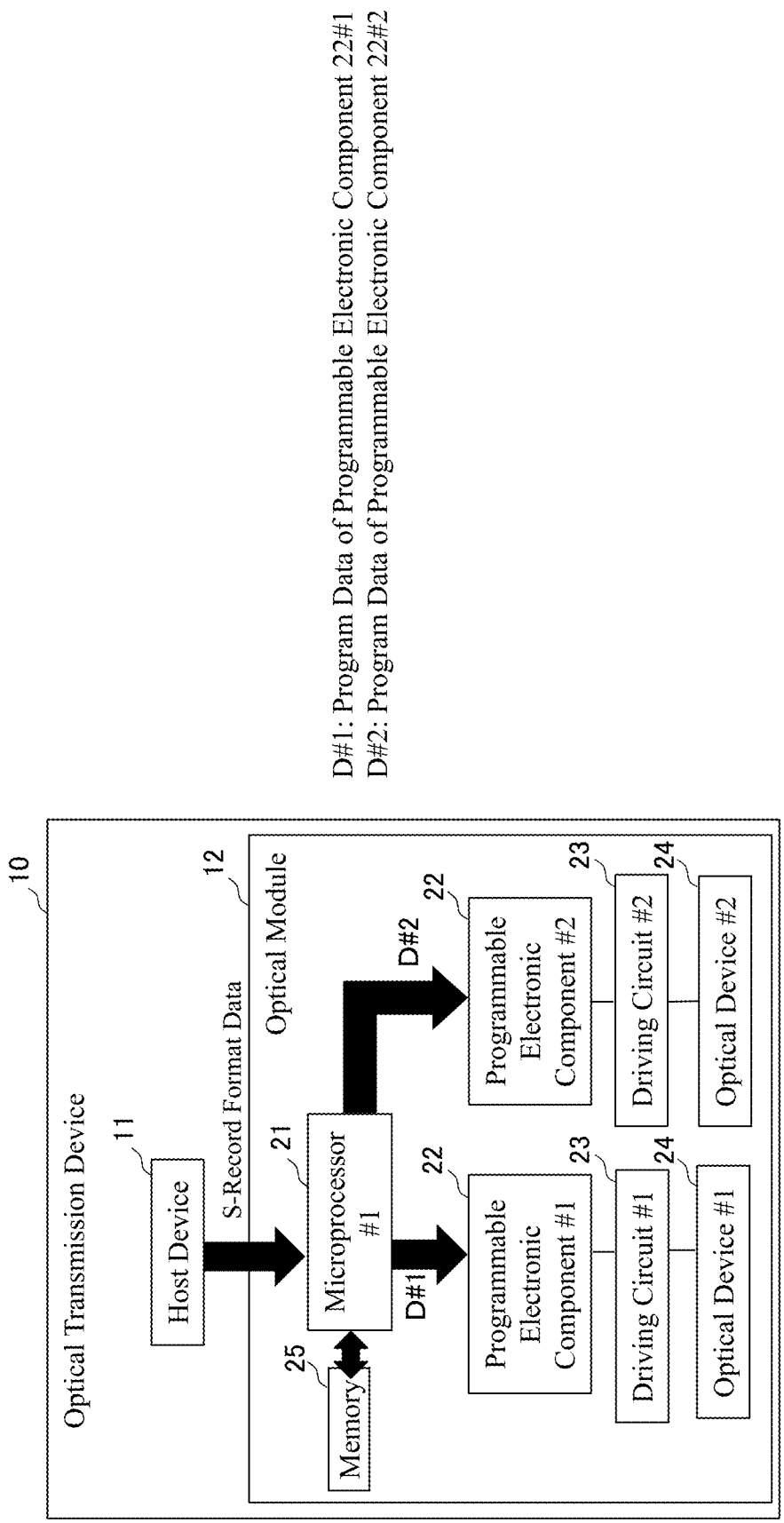
FIG. 4 is an example of a method for updating program data according to a first technique.

The device 124 is an optional device included in the module 112, and corresponds to an optical device 24 illustrated in and after FIG. 4. The electronic component 122 has a function to control the operation of the device 124, and corresponds to a programmable electronic component 22 and a driving circuit 23 illustrated in and after FIG. 4. The microprocessor 121 has a function to control the electronic component 122 disposed in the module 112, and corresponds to a microprocessor 21 illustrated in and after FIG. 4. The memory 125 may have a function to store the data of the microprocessor 121 and be disposed in the microprocessor 121.

As the module 112, for example, an optical transmission module, an optical reception module, an optical amplification module, and an optical switch module can be exemplified. When the module 112 is the optical transmission module, the device 124 is, for example, a light source or a light modulator. When the module 112 is the optical reception module, the device 124 is, for example, an optical receiver or an amplifier. When the module 112 is the optical amplification module, the device 124 is, for example, an optical amplifier. When the module 112 is the optical switch module, the device 124 is, for example, an optical switch.

In this disclosure, by applying S-record format data, the microprocessor 121 executes an update of the electronic component 122 as well. In view of this, this disclosure ensures making the program data and any other data of the electronic component 122 included in the module 112 updatable as well while the control program of the microprocessor 121 included in the module 112 is in operation.

(First Technique of this Disclosure)

FIG. 4 illustrates a method for updating program data according to a first technique of this disclosure. Also in here, paths on which program data for update are downloaded are indicated by thick arrows. In this example, an optical device 24#1 and an optical device 24#2 are included in an optical module 12, and a programmable electronic component 22#1 and a programmable electronic component 22#2, and a driving circuit 23#1 and a driving circuit 23#2 are each mounted in order to drive the optical device 24#1 and the optical device 24#2 in accordance with instructions of a microprocessor 21#1. The driving circuit 23#1 causes the optical device 24#1 to be operated under a control of the programmable electronic component 22#1, and the driving circuit 23#2 causes the optical device 24#2 to be operated under a control of the programmable electronic component 22#2.

When control programs of the microprocessor 21#1 and the programmable electronic components 22#1 and 22#2, which are disposed in the optical module 12, are updated with program data obtained by a communication unit 113 from the outside, a host device 11 downloads data in the S-record format that includes program data for updating the microprocessor 21#1, the programmable electronic component 22#1, and the programmable electronic component 22#2 to the microprocessor 21#1 as update information. Next, after recovering these program data on a memory 25, the microprocessor 21#1 updates the program data of itself, and for the control program data corresponding to the programmable electronic component 22#1 and the programmable electronic component 22#2, this is also updated by downloading program data D#1 and D#2 for update to the respective programmable electronic components 22#1 and #2 through the paths of the thick arrows. Here, D#1 is program data for the programmable electronic component 22#1, and D#2 is program data for the programmable electronic component 22#2. The detail of this updating method will be described using an exemplary configuration of data in the S-record format below.

Figure 5:
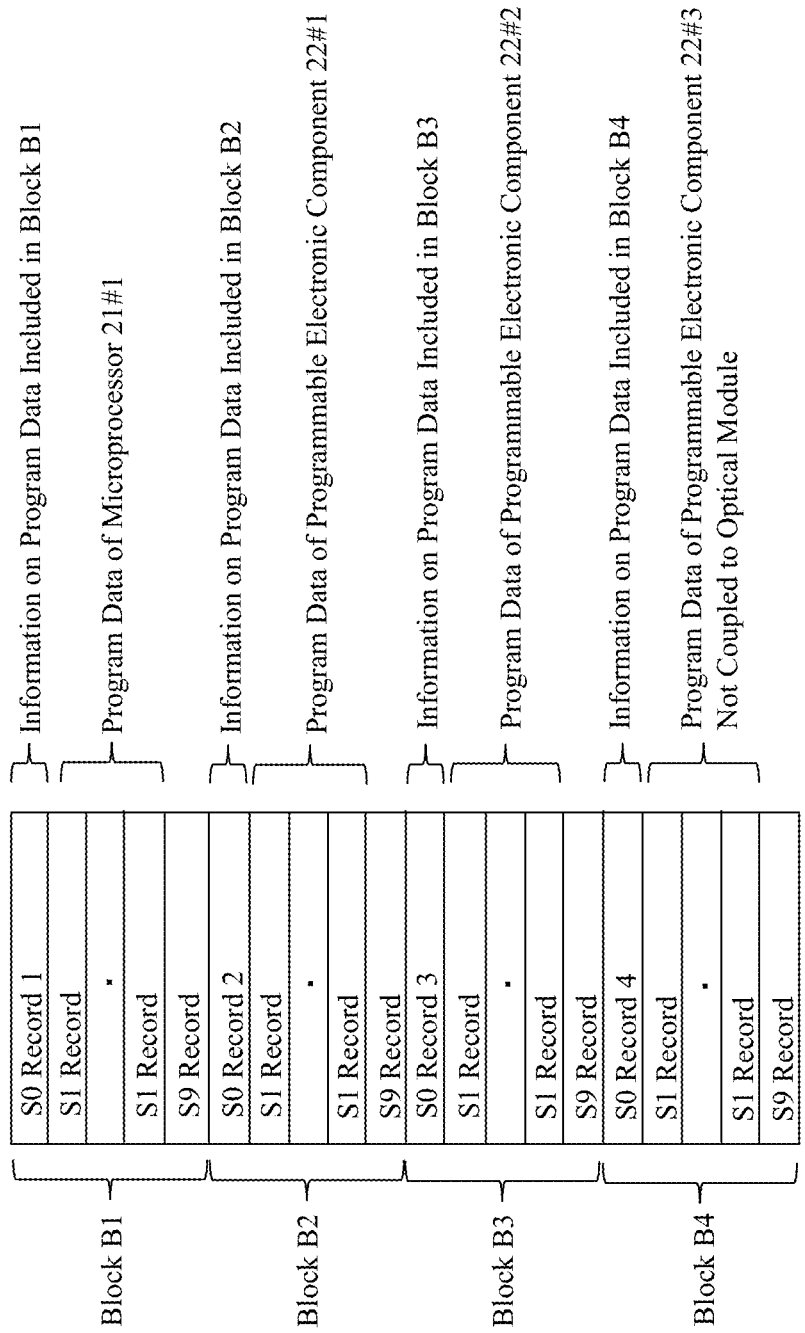
FIG. 5 is an example of S-record format data downloaded from a host device according to the first technique.

FIG. 5 illustrates an exemplary configuration of data in the S-record format used in the updating method of this disclosure. The data in the S-record format used in this disclosure is joint blocks (B1 to B4) of a plurality of the blocks each constituted of a sequence of S-records that starts with an S0 record and is terminated with an S9 record with an S1 records interposed therebetween. These blocks may be in any order. Also for the S-records in the block, a combination of two records that are program data and end records may be a combination of two records that are an S2 record and an S8 record or that are an S3 record and an S7 record, instead of the combination of the S1 record and the S9 record used in the example described here, and the combination of two records is arbitrary.

In the method for updating program data according to this disclosure, only one piece of identification information on an update target is written in the S0 record of each block in the data in the S-record format, and identification codes unique to the microprocessor 21 and the programmable electronic component 22 to which the program data of the block including the identification information is applied are written in the identification information on the update target. As the identification codes of the microprocessor 21 and the programmable electronic component 22, for example, serial numbers and model numbers provided without overlapping for the microprocessor 21 and the programmable electronic component 22 in the optical module 12 can be exemplified.

Besides the above-described identification codes, it is preferred that information such as a parameter that is needed when the microprocessor 21#1 downloads the program data to the programmable electronic component 22 is written in the identification information written in the S0 record of each block. As this parameter that is needed, for example, a type (such as a CPU, a programmable system on chip (PSoC), and a field-programmable gate array (FPGA)) of the programmable electronic component 22 and a version of the program data can be exemplified.

In this disclosure, it is possible to employ a configuration in which a part or all of the information such as the parameter that is needed when the download is performed is not written in the S0 record except for the above-described identification codes among the information included in the above-described identification information. For example, a correspondence table of specifications of interfaces between the microprocessor 21 and the programmable electronic components 22 may be stored in the microprocessor 21 or the memory, and a reference may be made to this. For this correspondence table, one preliminarily held, one generated at the time of activating the optical module 12, or one stored at the time of updating the program data of the microprocessor 21 can be used. Note that the specifications of the interfaces between the microprocessor 21 and the programmable electronic components 22 include any specification of program data updating means of the programmable electronic component 22. For example, the program data updating means is not limited to hardware, but also includes a specification of software, such as a control program.

As a method for writing identification information, a function with which any character string can be entered as a specification of the S0 record in the S-record format is used. For example, according to aforementioned Non-Patent Literature 2, an S0 record is constituted of the following ASCII string.

S00600004844521B

Here, S0 at the head indicates that this character string is an S0 record, subsequent 06 indicates that the number of bytes of the further subsequent is 6 bytes, 0000 indicates a load address, and 484452 indicates a character string "HDR" by ASCII codes. 1B at the last is a checksum of the character string of the above. A region of the character string "HDR" may use up to maximum of 252 bytes depending on the specification of the S-record. Therefore, in this disclosure, the identification information on the update target is written in the portion of the character string "HDR" in this example.

Figure 6:
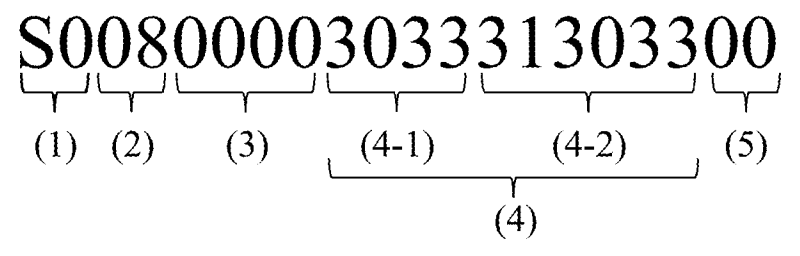

For example, when the identification codes of the microprocessor 21 and the programmable electronic components 22#1 and 22#2 are defined in order by serial numbers of 01 to 03, and a program version is Rev. 1.0.3, an S0 record can be expressed as in FIG. 6.

"S0" in (1) indicates that the record type is S0.

"08" in (2) indicates that the number of bytes after (3) is 8 bytes.

"0000" in (3) indicates a load address.

(4) is the identification information on the update target, and includes the following.

"3033" in (4-1) indicates that the identification code is "03," that is, the update target is the programmable electronic component 22#2.

"313033" in (4-2) indicates that the program version is Rev. 1.0.3. "00" in (5) indicates a checksum of a range from (2) to (4).

The microprocessor 21#1 that has received the data in the S-record format described above recovers the program data of the respective blocks in regions on the memory (for example, the memory 25 in FIG. 4) according to the addresses included in the S-records. Next, the microprocessor 21#1 identifies whether each of the data, recovered in the respective regions on the memory, corresponds to the program data of #1 or #2 in the programmable electronic components 22 based on the information read from the S0 records of the respective blocks. For the ones for the programmable electronic components 22 included in the optical module 12, the microprocessor 21#1 downloads the program data from the microprocessor 21#1 to the programmable electronic component 22 via communicating means for the corresponding programmable electronic component 22 and executes the update. At this time, procedures of downloading and updating are executed by the microprocessor 21#1 according to the specifications of the respective programmable electronic components 22 as described in a third technique.

In the S-record format data illustrated in FIG. 5, the program data for the microprocessor 21#1 that receives the data is written in the block B1, the program data for two programmable electronic components 22 included in the optical module 12 are written in the blocks B2 and B3, and in addition to these, the program data for a programmable electronic component 22#3 not coupled to the optical module 12 is also included in the block B4.

Since the microprocessor 21 of the optical module 12 thus recognizes the programmable electronic components 22 under its control, selects ones that conform from the program data included in the respective blocks of the S-record, and downloads the ones to the programmable electronic components 22 under the control, the host device 11 ensures downloading only the blocks for the programmable electronic components 22 that need an update of the program data to the optical module 12 including the programmable electronic component 22. It is also possible to download the block for the programmable electronic component 22 not included in the optical module 12 to the optical module 12. In the latter case, it is possible to download the same S-record format data that includes the blocks of the program data for these different programmable electronic components 22 together, to a plurality of the optical modules 12 constituted of the different programmable electronic components 22.

As a specific example of when the host device 11 downloads only a block for a programmable electronic component 22 that needs the update of the program data to the optical module 12 including that programmable electronic component 22, there is a case where the communication unit 113 of the information processing device receives only program data for a programmable electronic component 22 subjected to a change in program data among the plurality of programmable electronic components 22 mounted in the optical module 12 included in the information processing device. At this time, the host device 11 may read out the program data for the programmable electronic component 22 without change in program data from the past program data recorded in the memory 114 and recreate an S-record that includes the program data for all the programmable electronic components 22 mounted in the optical module 12, however, since the microprocessor 21 of the optical module 12 can select a target programmable electronic component 22 from the S0 record included in the block downloaded from the host device 11, the host device 11 ensures downloading only the block for the programmable electronic component 22 subjected to a change in program data received by the communication unit 113 directly to the optical module 12.

Since the microprocessor 21#1 selects the programmable electronic component 22 whose program data is to be updated among the programmable electronic components 22 included in the optical module 12 according to the information written in the S0 record located at the head of each block, the microprocessor 21#1 downloads the program data of the block B2 to the programmable electronic component 22#1. Meanwhile, no download is performed to the programmable electronic component 22#2 since no corresponding block is included. This causes the program data of the programmable electronic component 22#1 that needs an update to be updated, but no data is updated in a program of the programmable electronic component 22#2 that does not need the update. With this method, since only the program data for the programmable electronic component 22#1 that needs an update is downloaded from the host device 11 and updated, a size of the data in the S-record format can be reduced, thereby providing an advantage of shortening a period of communication occupying the communicating means.

Figure 7:
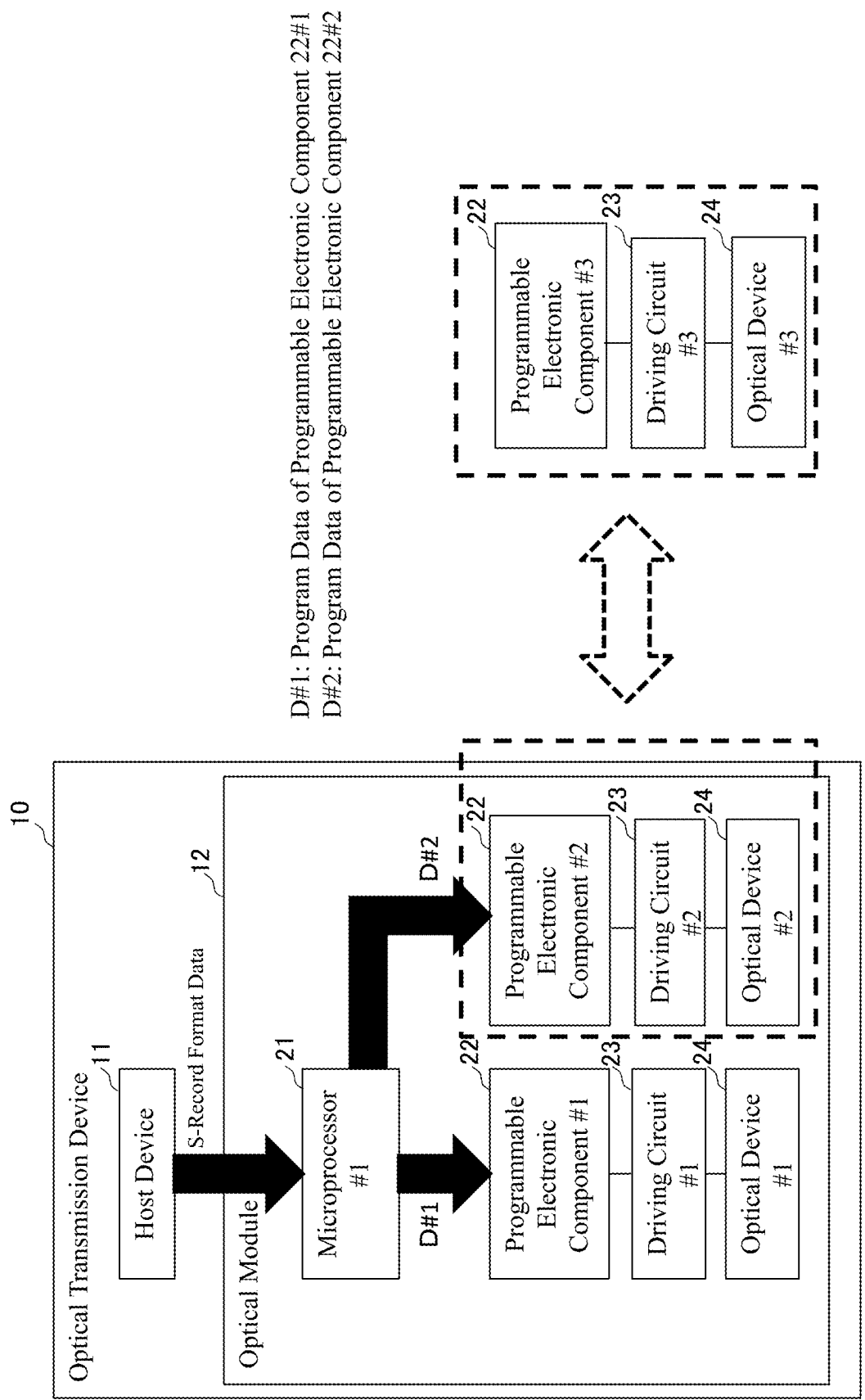
FIG. 7 is an exemplary optical module configuration when a submodule capable of inserting and removing the module is included.

As a specific example where the host device 11 downloads the block for the programmable electronic component 22#3 not included in the optical module 12 to the optical module 12, there is a case where the program data is downloaded to the optical module 12 including an insertable/removable submodule in the optical module configuration in FIG. 4. At this time, the host device 21 may query the microprocessor 11 for the information on the programmable electronic components 22#1 and 22#2 mounted at this timing and create an S-record in which only the block for the programmable electronic components 22 mounted at this timing is included, however, since the microprocessor 21 can select programmable electronic components 22 that correspond to the respective blocks by the S0 records of the respective blocks, it is only necessary to download the S-record in which the program data of all programmable electronic components 22 that are possibly inserted or removed are included without querying the microprocessor. That is, in the configuration in FIG. 7, the S-record including the program data for the programmable electronic components 22#2 and 22#3, which are included in the insertable/removable submodule, can be download from the host device 11 along with the programmable electronic component 22#1.

When the programmable electronic component 22#2, the driving circuit 23#2, and the optical device 24#2 are included in the insertable/removable submodule, and replacing it with another submodule including the programmable electronic component 22#3, a driving circuit 23#3, and an optical device 24#3 during the operation causes the other submodule to be newly placed under the control of the microprocessor 21#1, and therefore, the microprocessor 21#1 selects an appropriate program code from the same S-record and downloads the program code to the programmable electronic component 22#3.

Figure 8:
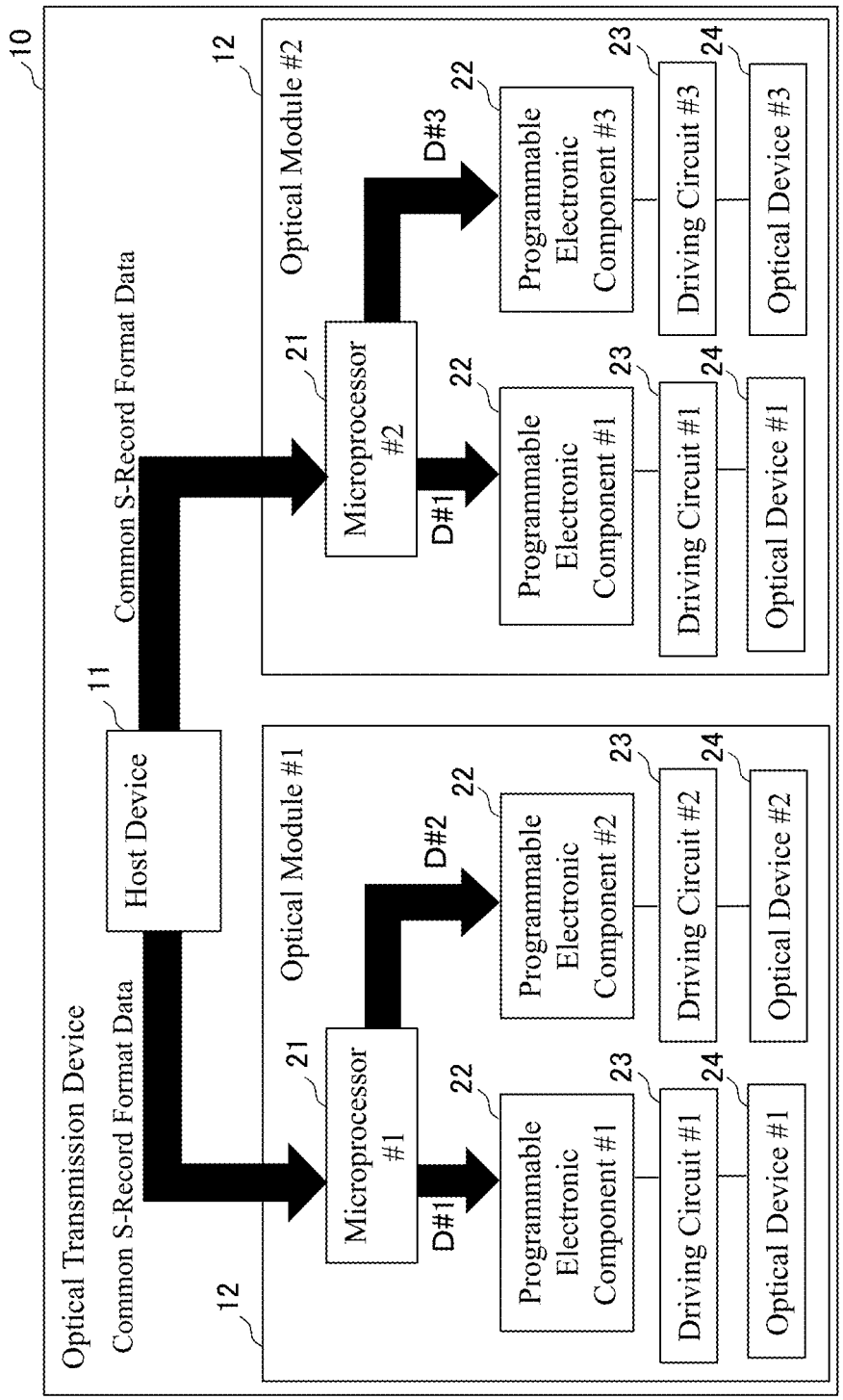
FIG. 8 is an example of a method for updating program data of an optical module in a different configuration according to the first technique.

An alternative case is where an optical module 12#1 in which the programmable electronic component 22#2, the driving circuit 23#2, and the optical device 24#2 are always mounted; and an optical module 12#2 in which the programmable electronic component 22#3, the driving circuit 23#3, and the optical device 24#3 are always mounted are included in an optical transmission device 10 (FIG. 8). When two types of the optical modules 12 are mounted in the optical transmission device 10, downloading the data in the S-record format illustrated in FIG. 5 to these optical modules 12 from the host device 11 allows respective microprocessors 21#1 and 21#2 to select program data (a block) for a programmable electronic component 22 whose program data is to be updated in the respective optical modules 12 among the data in the S-record format received according to the configurations of the respective optical modules 12. Therefore, the host device 11 can update the program data of these optical modules 12 using the same S-record format data without depending on the combination of the programmable electronic components 22 included in the optical module 12.

The common S-record format data illustrated in FIG. 5 is downloaded from the host device 11 to these optical modules 12#1 and 12#2. The microprocessor 21#1 selects necessary program data (D#1, D#2) according to the programmable electronic components 22 included in the optical module 12#1 and downloads them to the programmable electronic components 22#1 and 22#2, and the microprocessor 21#2 selects necessary program data (D#1, D#3) according to the programmable electronic components 22 included in the optical module 12#2 and downloads them to the programmable electronic components 22#1 and 22#3, thus updating them. Here, D#1 is the program data for the programmable electronic component 22#1, and D#3 is program data for the programmable electronic component 22#3. This ensures causing the host device 11 to update the program data of the optical modules 12#1 and 12#2 having different configurations with update information made of the same S-record format data.

As described above, the first technique of this disclosure provides the means in which, in the optical module 12 including the plurality of programmable electronic components 22, the microprocessor 21 located in the optical module 12 and coupled to the host device 11 via the communicating means uses the same update information in the S-record format downloaded from the host device 11 using the communicating means to update the control programs of the plurality of programmable electronic components 22 included in the above-described optical module 12.

With this disclosure, the above-described S-record format update information is constituted of the joined blocks of the plurality of program data, each block is constituted of a sequence of S-record starting with the S0 record to be terminated with any record of the S7 record, the S8 record, or the S9 record, and an attribute of the programmable electronic component 22 to which the block that includes the S0 record is applicable and a parameter and the like necessary for updating the program data of the programmable electronic component 22 are described in the S0 record.

Furthermore, in each block included in the S-record format update information according to this disclosure, the program data applicable to the programmable electronic component 22 not included in the optical module 12 when the program data is updated may be included in addition to the program data applicable to the programmable electronic component 22 included in the optical module 12.

With the above-mentioned method for updating program data, the microprocessor 21 that has received the S-record format update information from the host device 11 uses the information described in the S0 records of the respective blocks included in the data to select only the program data applicable to the programmable electronic components 22 included in the optical module 12 from the blocks of the respective program data and download the program data according to the specifications of the respective programmable electronic components 22 to the programmable electronic components 22 as the update targets in the optical module 12. Therefore, the host device 11 has a feature that using one piece of S-record data ensures updating the program data of the optical module by which the configuration of the programmable electronic components 22 varies and the optical module 12 in which the combination of the mounted programmable electronic components 22 may be changed because the optical module 12 employs the removable programmable electronic components 22, as well as updating the program data of the programmable electronic components 22 in the optical module 12 during the operation of the optical transmission device 10.

(Second Technique of this Disclosure)

Figure 9:
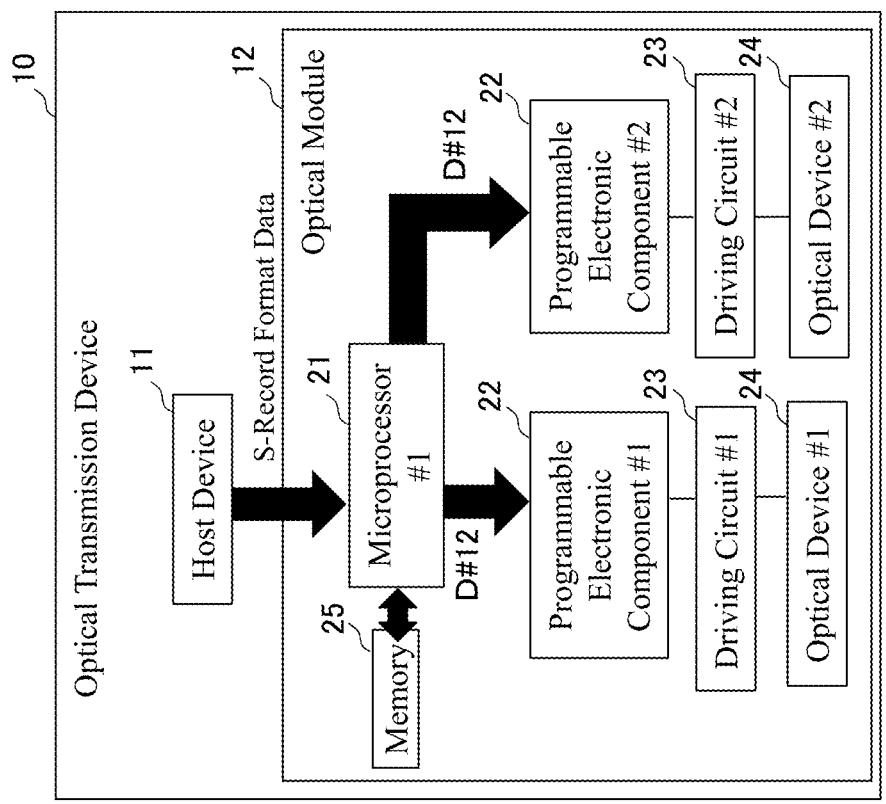
FIG. 9 is an example of a method for updating program data according to a second technique.

FIG. 9 illustrates a method for updating program data according to a second technique of this disclosure. In this example, since a programmable electronic component 22#1 and a programmable electronic component 22#2 operate with the same control program, the same program data D#12 can be used when updates are necessary for the two programmable electronic components 22. In the updating method of this disclosure, for example, the same identification information is included in the programmable electronic components 22 operating with the same control program.

In FIG. 9, the microprocessor 21#1 determines the programmable electronic component 22 to which it is applicable based on information written in S0 records from data in the S-record format downloaded from the host device 11. In the example of this drawing, the same identification information is included in the programmable electronic component 22#1 and the programmable electronic component 22#2 since the same program data is applicable to them both, and the microprocessor 21#1 downloads the same program data to the programmable electronic component 22#1 and the programmable electronic component 22#2 based on this information, and performs updates.

Figure 10:
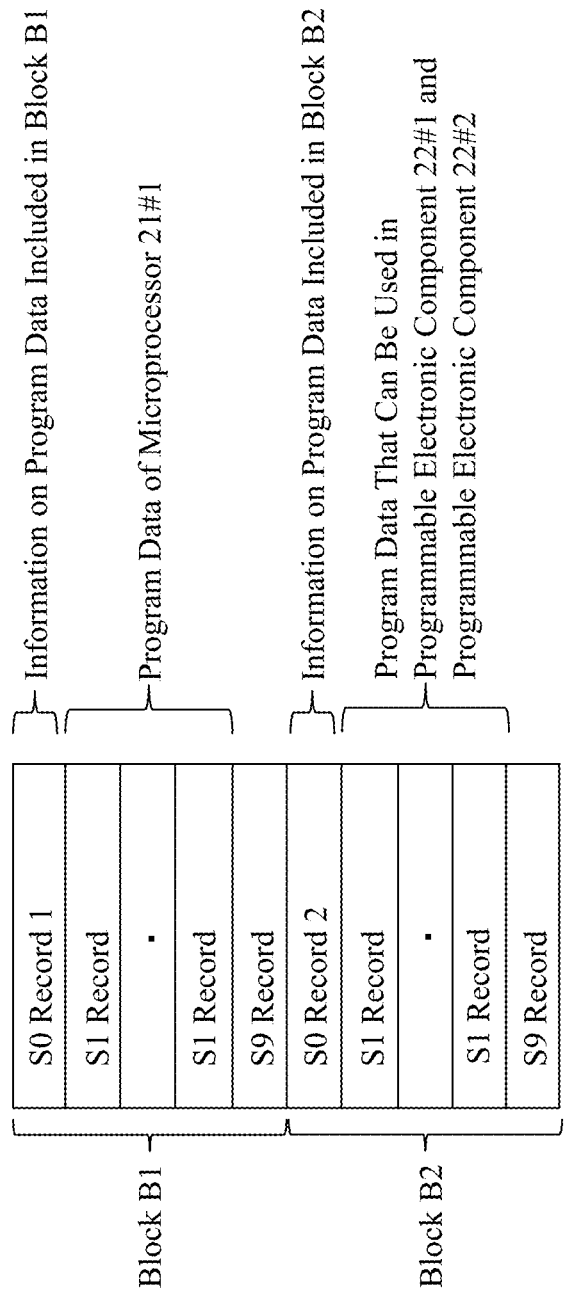
FIG. 10 is an example of S-record format data downloaded from a host device according to the second technique.

FIG. 10 illustrates a configuration of the data in the S-record format used in the updating method of this disclosure. This data is constituted of only two blocks B1 and B2 of the program data (the block B1) used for the microprocessor 21#1 and the program data (the block B2) commonly used for the programmable electronic component 22#1 and the programmable electronic component 22#2.

As the identification information on the update target in the S0 record of the block B2, for example, product model numbers unique to the programmable electronic component 22#1 and the programmable electronic component 22#2 can be exemplified. When the optical module 12 is activated, the microprocessor 21 reads identification codes (the product model numbers) of the programmable electronic components from the programmable electronic components 22 coupled thereto via communicating means, and records the identification codes (the product model numbers) and a correspondence table of the communicating means corresponding to the product model numbers for coupling to the programmable electronic components 22 in the memory.

While the program data of the programmable electronic component 22 is updated, upon receiving the S-record from the host device 11, the microprocessor 21 identifies which programmable electronic component 22 the program data recovered on the memory from the received S-record corresponds to, based on the information read from the S0 records, and selects the blocks of the S-record that should be downloaded to the respective programmable electronic components 22 and the communicating means corresponding to the product model numbers based on the correspondence table recorded in the memory and updates the program data of the programmable electronic components 22 as the update targets. To the programmable electronic components 22 with the same identification code (the product model number), the same block of the S-record is downloaded via the same communicating means.

As described above, with the method for updating program data of this disclosure, the microprocessor 21 coupled to the host device 11 via the communicating means ensures selecting types of the programmable electronic components 22 to which the program data are applicable from the information written in the S0 records at the head of the respective blocks. Therefore, when a common identification code is included in the identification information written in each of the S0 records, the microprocessor 21 can uniformly download the program data included in the blocks to the plurality of programmable electronic components 22 having the same identification code in the optical module 12 and update them.

With this method, compared with the method that prepares the block of the program data for each of the programmable electronic components 22 included in the optical module 12, the number of the program data included in the S-record format update information is reduced, thereby ensuring the reduced size of the S-record format data necessary for communication and the time period during which the communicating means is occupied.

(Third Technique of this Disclosure)

Figure 11:
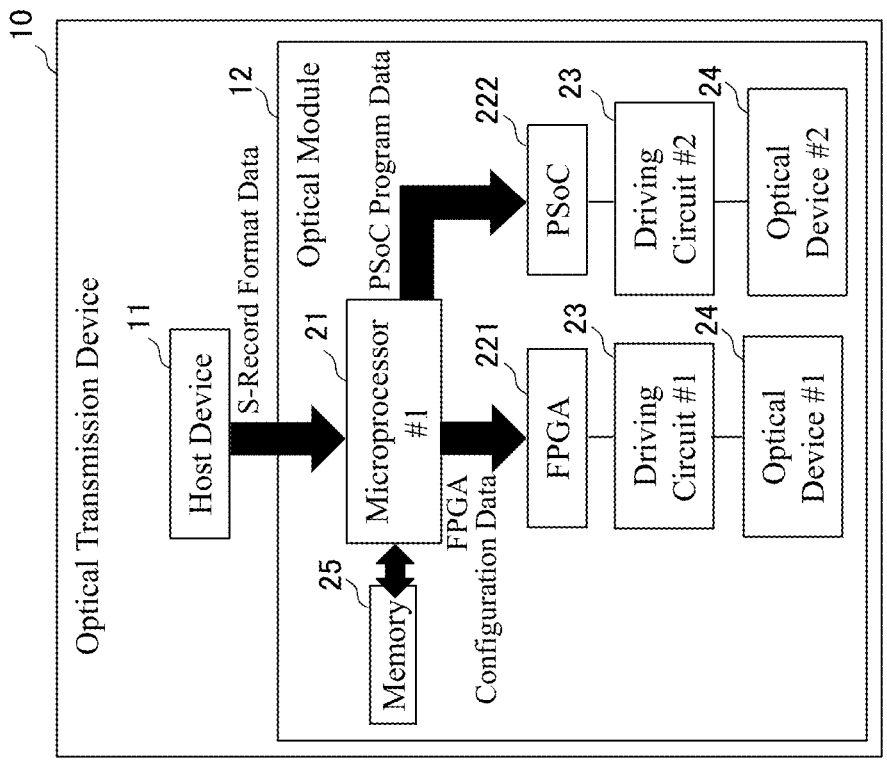
FIG. 11 is an example of a method for updating program data according to a third technique.

FIG. 11 illustrates a method for updating program data according to a third technique of this disclosure. In the example of this drawing, a Field-Programmable Gate Array (FPGA) 221 and a Programmable System-on-Chip (PSoC) 222 are included in the optical module 12 as programmable electronic components.

In this case also, similarly to the first technique, after receiving program data in the S-record format and deploying it in a memory 25, a microprocessor 21#1 coupled to a host device 11 via the communicating means identifies whether the program data is for the FPGA or for the PSoC based on the information of S0 records therein, downloads the program data to the programmable electronic component, such as the FPGA or the PSoC, in the optical module 12, and updates it.

At this time, the downloading of the program data to the programmable electronic component from the microprocessor 21#1 and the updating of it comply with specifications of an interface and the like of the programmable electronic component. Specifically, specifications of serial communications with three signal lines, such as a Universal Asynchronous Receiver/Transmitter (UART) and four communication lines added with a clock, such as a Joint Test Action Group (JTAG), and specifications of transmission data format and the like, such as ASCII codes and binary codes, are listed. Additionally, in case of update of an application program, interfaces that fit to a communication port, such as an Inter-Integrated Circuit (I2C) and a Universal Serial Bus (USB) are also listed.

For example, configuration data is transferred to the FPGA 221 by serial communication means and, for example, data in Intel (registered trademark) Hex format is transferred to the PSoC 222 according to the specifications of the component via serial communication means. That is, the transferring procedure is selected according to the specifications of the programmable electronic component of the update target to which download and update are performed.

Figure 12:
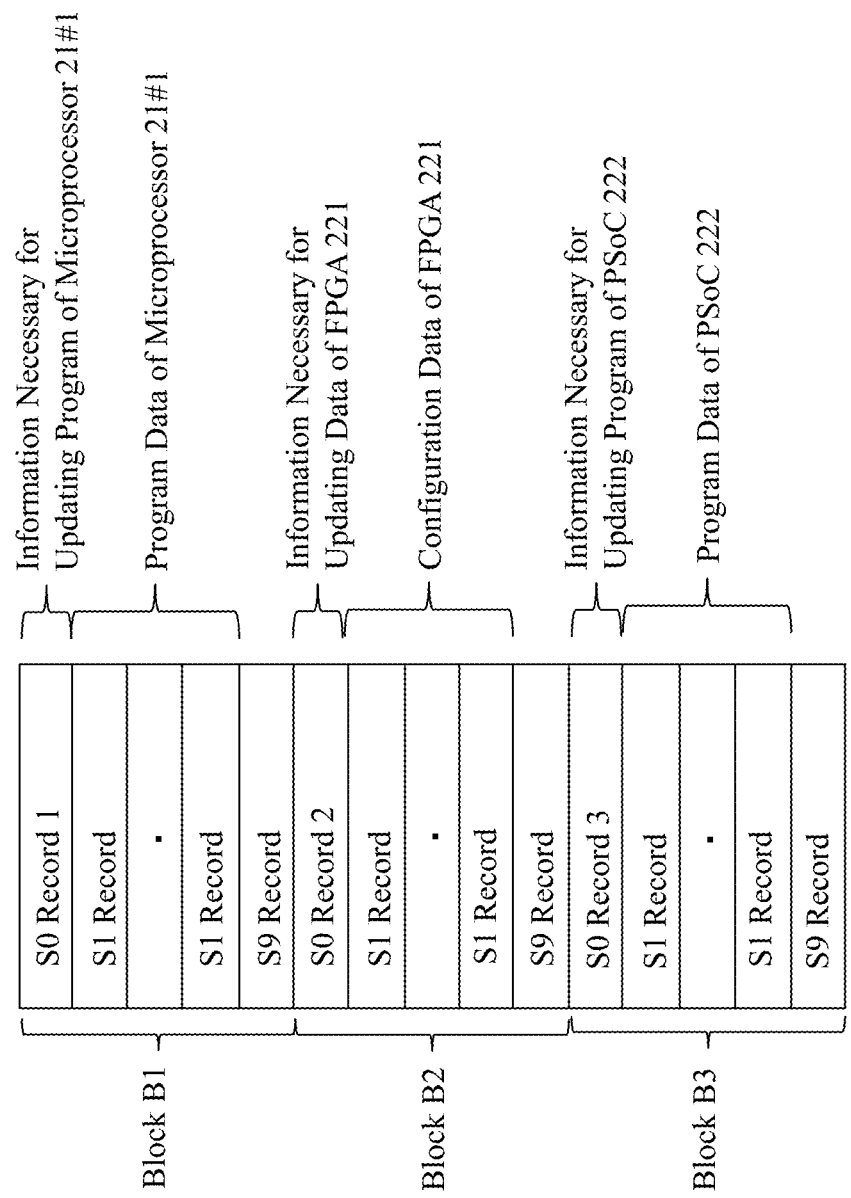
FIG. 12 is an example of S-record format data downloaded from a host device according to the third technique.

FIG. 12 illustrates a configuration of S-record format data to be downloaded to the microprocessor 21 from the host device 11. In this case, program data divided into three blocks of B1, B2, and B3, of the microprocessor 21#1, the FPGA 221, and the PSoC 222 is transmitted to the microprocessor 21#1 from the host device 11 as one piece of S-record format data.

For example, in the S0 record located at the start of each block, an identification code, a version of the program data, and the number of bytes of the program data for the programmable electronic component, to which the program data included in the block is downloaded, are written. In the third technique, using the identification code of the programmable electronic component, the program data according to the respective programmable electronic components and downloading means of the program data are selected based on a correspondence table recorded in the memory 25, and it is identified whether they are for the FPGA 221 or for the PSoC 222, the microprocessor 21#1 uses an interface for serial communication coupled to another programmable electronic component in the optical module 12 to ensure transferring the program data to the respective programmable electronic components by the downloading means according to the respective programmable electronic components as well as updating its own program data.

As described above, the third technique of this disclosure has a feature that the programmable electronic component in the optical module 12 is the microprocessor 21, the FPGA 221, or the PSoC 222 in the above-described method for updating program data.

With this technique, after recovering the transmitted S-record as binary data or text data in the memory 25 in the optical module 12, the microprocessor 21 that has communicating means with the host device 11 can select and execute the downloading means for the program data according to the respective programmable electronic component based on the identification information on the update targets and the information necessary for updating the program data written in the S0 records located at the head of the respective blocks.

(Fourth Technique of this Disclosure)

Figure 13:
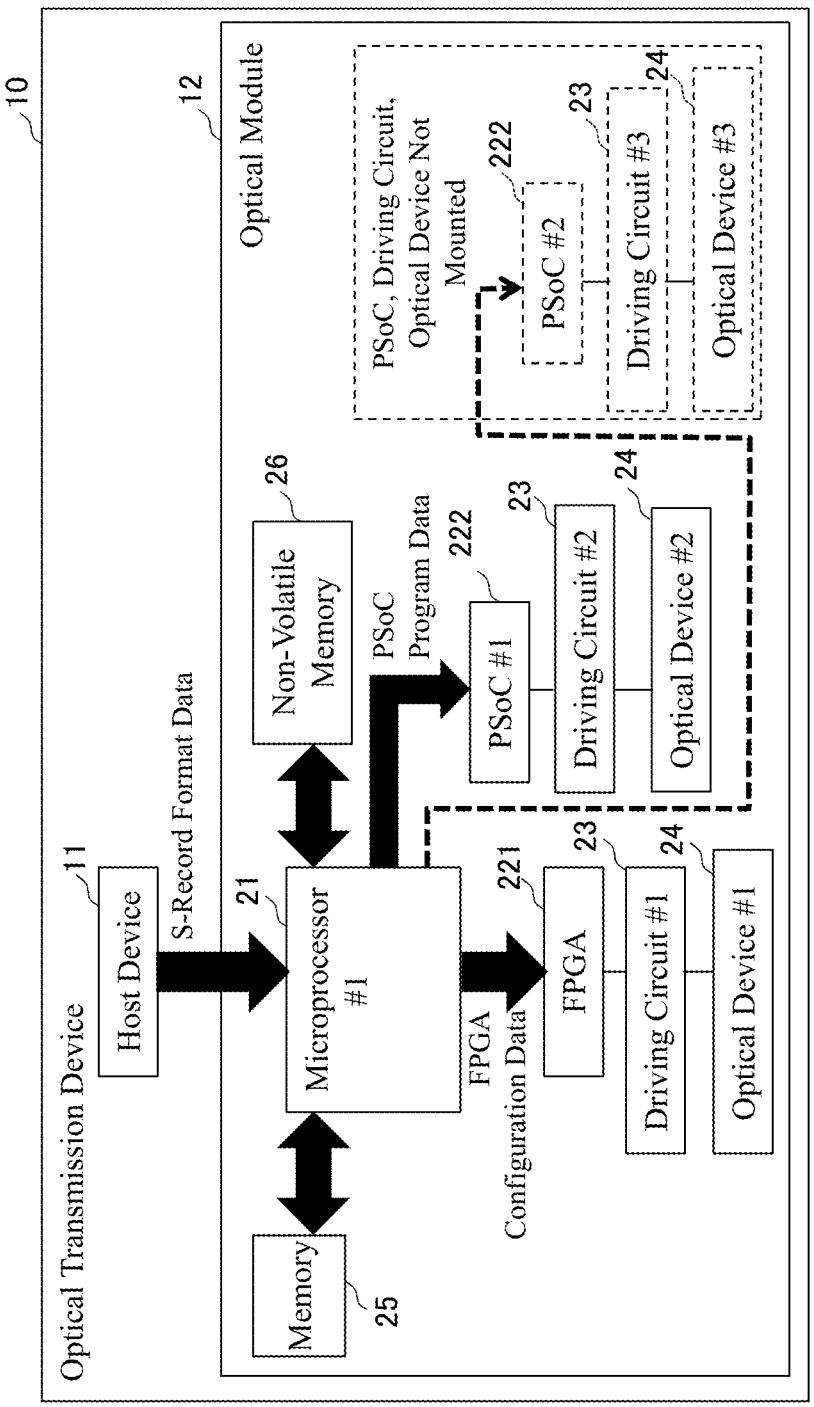
FIG. 13 is an example of a method for saving program data in a non-volatile memory in an optical module according to a fourth technique.

FIG. 13 illustrates a method for updating program data according to a fourth technique of this disclosure. According to this technique, a non-volatile memory 26 is also coupled to a microprocessor 21#1, which is coupled to a host device 11 via communicating means. After recovering data in the S-record format downloaded from the host device 11 on a memory 25, the microprocessor 21#1 records replications in a region on the non-volatile memory 26 for each programmable electronic component as a target. Afterwards, the program data of the programmable electronic components in the optical module 12, such as the microprocessor 21#1, the FPGA 221, and a PSoC 222#1, are updated.

In a case where a problem caused by the program data of any of the programmable electronic components occurs by an operation after the update, the microprocessor 21#1 can download program data of an old version saved in a region of the non-volatile memory 26 to itself or a corresponding programmable electronic component and update it, thereby ensuring recovering to a normal operation without downloading the S-record format data including the old version from the host device 11. Note that a PSoC 222#2, a driving circuit 23#3, and an optical device 24#3, which are indicated by the dashed line in the drawing and are not mounted, are, for example, included in an insertable and removable module, and are possibly added during the operation.

Figure 14:
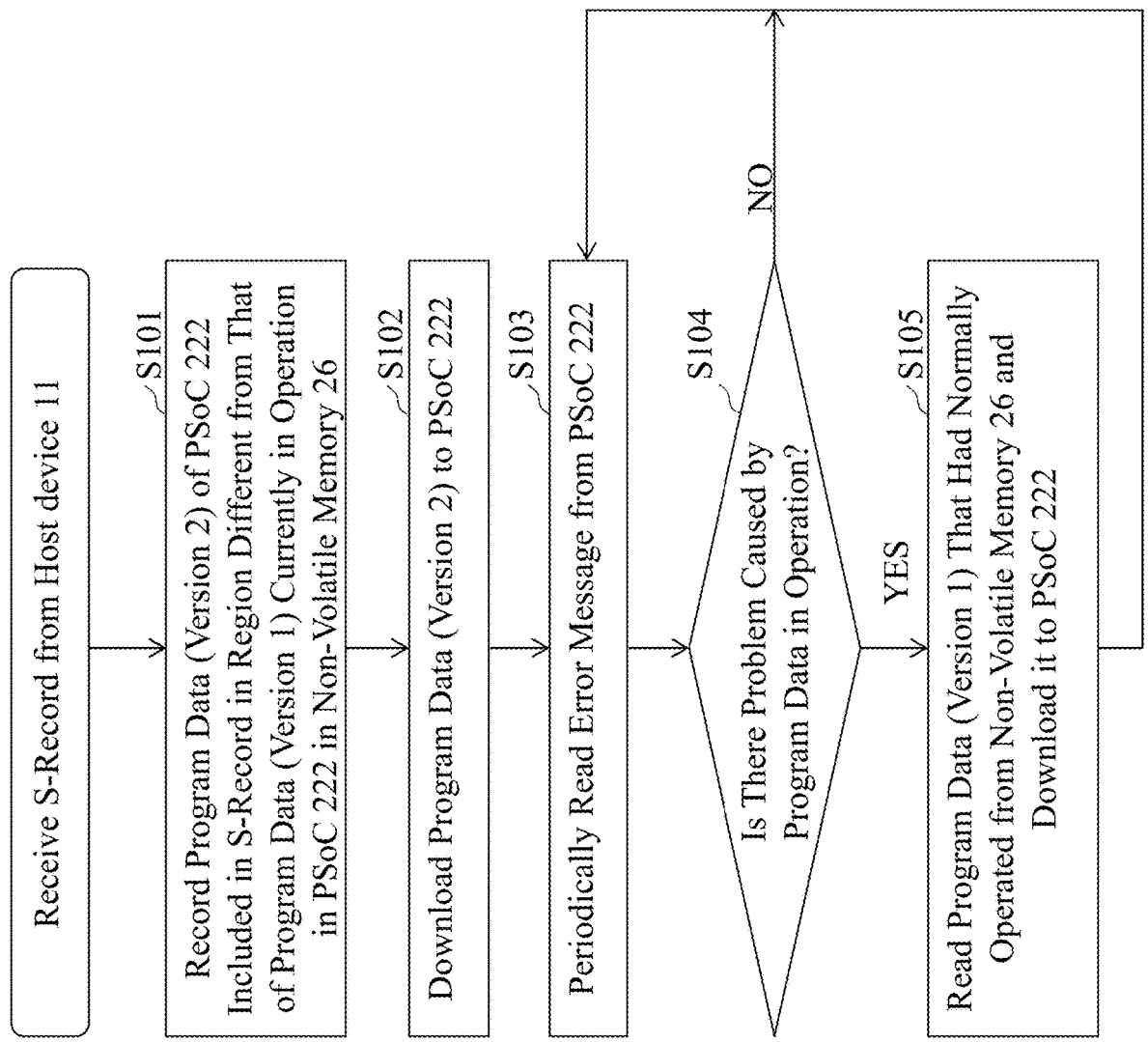
FIG. 14 is an example of a method for redownloading program data of a version that had normally operated to a PSoC.

FIG. 14 illustrates a procedure for downloading a program of a version that had normally operated to the PSoC 222 again with an example of a case where after the microprocessor 21 has downloaded program data to the PSoC 222, a problem occurs in the program data.

According to this drawing, when program data (version 2) of a new version of the PSoC 222 is included in an S-record downloaded from the host device 11 through the communicating means, the microprocessor 21 records the program data in a region different from that of program data (version 1) normally operating in the PSoC 222 on the non-volatile memory 26 (S101). Next, the microprocessor 21 downloads the program data (version 2) of the new version to the PSoC 222 and starts an operation (S102). Afterwards, the microprocessor 21 periodically reads an error message generated during the operation from a memory incorporated in the PSoC 222 using the communicating means (S103).

At this time, when an operational failure caused by the newly downloaded program is detected (S104), for example, when the PSoC 222 detects an error that a current monitor of the driving circuit 23 indicates an output outside an allowable range even though the microprocessor 21 has transmitted a command to set 100 mA as an output of the driving circuit #2 to the PSoC 222, the microprocessor 21 reads the program data (version 1) that had normally operated in the PSoC 222 before the update from the non-volatile memory 26 and downloads it to the PSoC 222 again (S105) to recover the operation of the optical module 12 to normal.

Figure 15:
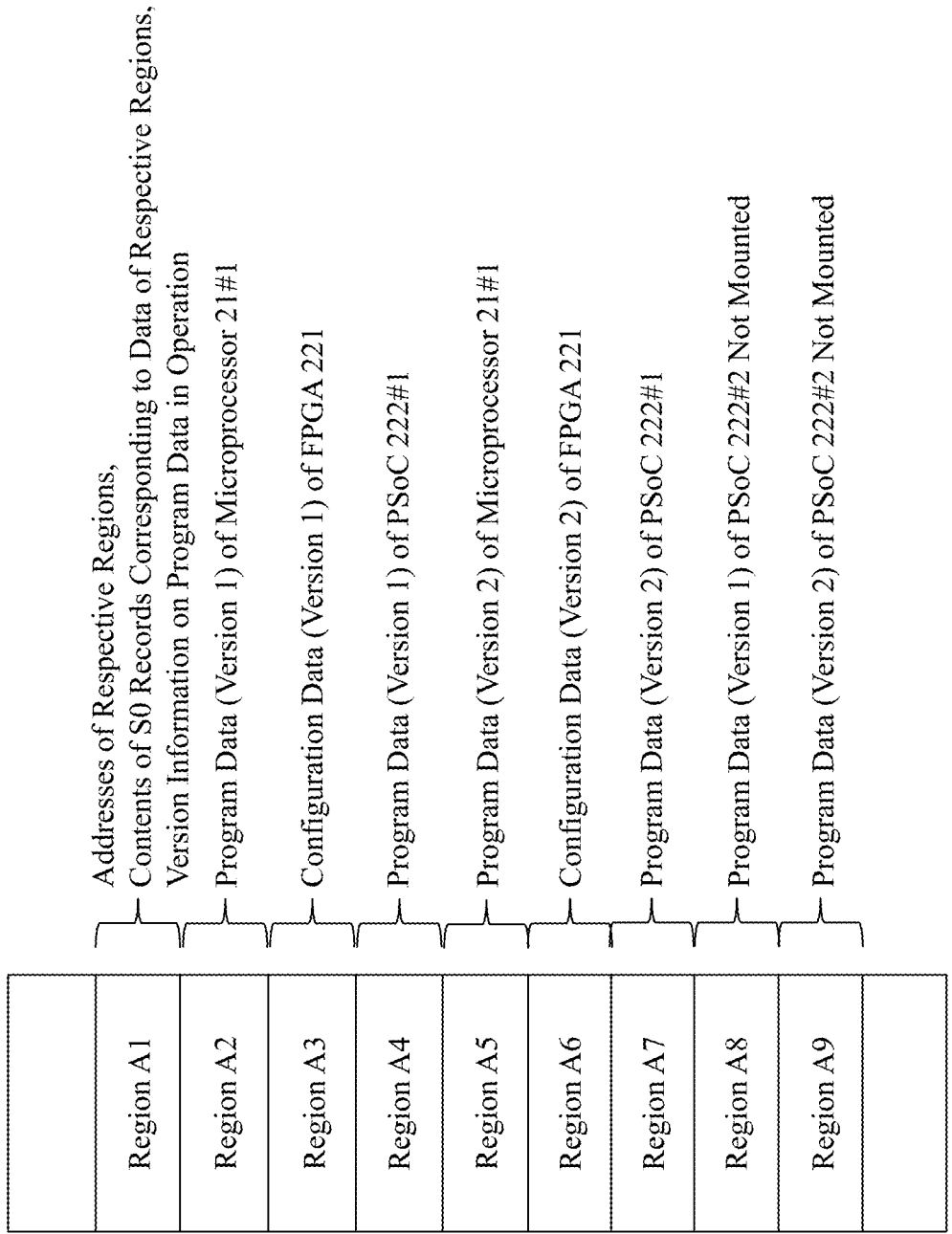
FIG. 15 is an example of a memory map of a non-volatile memory according to the fourth technique.

FIG. 15 illustrates an example of a memory map of the non-volatile memory 26 that records program data with this technique. In this example, program data of four programmable electronic components including the microprocessor 21#1 are each recorded in two versions. Here, in a region A1, together with addresses of program data recorded in a region A2 to a region A9 and information on versions of program data in operation, information written in the S0 records of the respective blocks when the data in the S-record format has been downloaded, that is, corresponding programmable electronic components, versions of the program data, and information necessary for update are also recorded. Accordingly, even when the program data is updated based on the data on the non-volatile memory 26, similarly to when the S-record format data is downloaded, by using the information recorded in the region A1, it can be downloaded to the programmable electronic component in the corresponding optical module 12.

Note that in the memory map in FIG. 15, program data of the PSoC 222#2 as a programmable electronic component not included in the optical module 12 is recorded in a region A8 and the region A9. With this configuration, also when the programmable electronic component in which the PSoC 222#2, the driving circuit 23#3, and the optical device 24#3, which are indicated by the dashed line in FIG. 13, are mounted is coupled in an insertable and removable configuration during the operation, the microprocessor 21#1 can compare version information on the program data for the PSoC 222#2 recorded in the region A1 of the non-volatile memory 26 with a version of the program data in operation in the coupled PSoC 222#2, compare versions of the program data in the region A8 and the region A9, and when the program data in the region A8 is the latest, read the program data from the region A8, download it to the newly coupled PSoC 222#2, and update the program data.

As described above, the fourth technique of this disclosure has, in the above-described method for updating program data, a feature of recording the program data included in the S-record downloaded from the host device 11 through the communicating means on the non-volatile memory 26 by each block, and recording the information such as the address on the memory where the above-described program data is placed, the versions of the program data written in the S0 records of the respective blocks, and the types of the programmable electronic components to which it is applicable, and the information such as the combination of the versions of the program data applied currently and in the past to the programmable electronic component in the optical module 12 in the different region from that of the program data on the same non-volatile memory 26.

With the updating method of this disclosure, by recording the program data of different versions on the non-volatile memory 26, when a problem occurs in the program data of the plurality of programmable electronic components included in the optical module 12, the operation can be recovered by downloading the program data of the version that had normally operated from the non-volatile memory 26.

It is also possible to record the program data to be applied to the programmable electronic component not coupled to the optical module 12 at the timing when the download is made from the host device 11 on the non-volatile memory 26, thereby providing an advantage that the program data can be updated as necessary even for the programmable electronic component newly coupled during the operation.

INDUSTRIAL APPLICABILITY

This disclosure is applicable to an information communication industry.

REFERENCE SIGNS LIST

10 Optical transmission device
11 Host device
12 Optical module
21 Microprocessor
22 Programmable electronic component
23 Driving circuit
24 Optical device
25 Memory
26 Non-volatile memory
100 Information processing device
111 Host device
112 Module
113 Communication unit
114 Memory
121 Microprocessor
122 Electronic component
124 Device
125 Memory
221 FPGA
222 PSoC

The invention claimed is:

1. A method for updating program data to update control programs of a microprocessor that controls an operation of an electronic component and the electronic component in a module that functions by causing the electronic component to operate, the method for updating program data comprising
executing by the microprocessor:
obtaining update information including one or more blocks in each of which includes identification information that identifies an update target and program data for updating the control program of the update target corresponding to the identification information, and storing the program data included in the update information by each block on a memory;
determining whether the update target is the microprocessor or the electronic component using the identification information; and
updating the control program of the update target using the program data corresponding to the update target, the method for updating program data characterized in that
the microprocessor and the electronic component have a unique identification code,
the blocks each store, in order,
a header record that indicates a start of an S-record and includes the one identification code,
program data corresponding to the identification code included in the header record, and
an end record that indicates a terminating end of the S-record, and
the microprocessor
selects blocks that conform to the electronic component under self control from among the one or more blocks using the identification code included in the header record contained in the one or more blocks, and
downloads only the selected blocks.

2. The method for updating program data according to claim 1, wherein
the identification information on the update target further includes a parameter that is needed when the microprocessor downloads program data to the electronic component besides an identification code that identifies the update target, and
the microprocessor:
identifies a specification of program data updating means of the electronic component using the parameter and the identification code; and
transfers the program data of the electronic component to the electronic component according to the specification.

3. The method for updating program data according to claim 2, wherein
the microprocessor:
identifies the specification of the program data updating means of the electronic component corresponding to the identification information written in the header record by referring to a correspondence table between the identification code unique to the electronic component and the specification of the program data updating means of the electronic component; and
transfers the program data of the electronic component to the electronic component according to the specification.

4. The method for updating program data according to claim 3, wherein
the module further includes a non-volatile memory, and
the microprocessor, after recording a replication of the program data of the electronic component in the non-volatile memory, updates a control program of the electronic component of the update target using the program data saved in the non-volatile memory.

5. The method for updating program data according to claim 2, wherein
the module further includes a non-volatile memory, and
the microprocessor, after recording a replication of the program data of the electronic component in the non-volatile memory, updates a control program of the electronic component of the update target using the program data saved in the non-volatile memory.

6. The method for updating program data according to claim 1, wherein
the module further includes a non-volatile memory, and
the microprocessor, after recording a replication of the program data of the electronic component in the non-volatile memory, updates a control program of the electronic component of the update target using the program data saved in the non-volatile memory.

7. A module that functions by causing an electronic component to operate, the module comprising
a memory that stores program data; and a microprocessor that controls an operation of the electronic component, wherein the microprocessor:
  obtains update information including one or more blocks in each of which includes identification information on an update target and the program data for updating a control program of the update target corresponding to the identification information and stores the program data included in the update information by each block on the memory;
  determines whether the update target is the microprocessor or the electronic component using the identification information; and
  updates also the program data of the electronic component using communicating means that couples between the microprocessor and the electronic component,
the microprocessor updates the program data characterized in that
the microprocessor and the electronic component have a unique identification code,
the blocks each store, in order,
a header record that indicates a start of an S-record and includes the one identification code,
program data corresponding to the identification code included in the header record, and
an end record that indicates a terminating end of the S-record, and the microprocessor
selects blocks that conform to the electronic component under self-control from among the one or more blocks using the identification code included in the header record contained in the one or more blocks, and
downloads only the selected blocks.

8. The module according to claim 7, wherein
the module includes:
  an optical module that transmits, receives, amplifies, or switches an optical signal; and
  a driving circuit that causes an optical device included in the optical module to operate under a control of the electronic component.

9. An information processing device comprising:
at least one module according to claim 7;
a communication unit that receives the update information from an outside; and
a host device that transfers the update information that has been received by the communication unit to each microprocessor included in the module.

10. An information processing device comprising:
at least one module according to claim 8;
a communication unit that receives the update information from an outside; and
a host device that transfers the update information that has been received by the communication unit to each microprocessor included in the module.

* * * * *